(No Model.)
J. J. MURPHY.
KEY.
No. 577,927.  Patented Mar. 2, 1897.
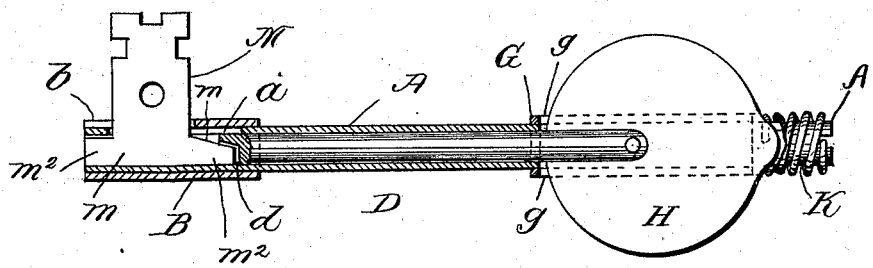
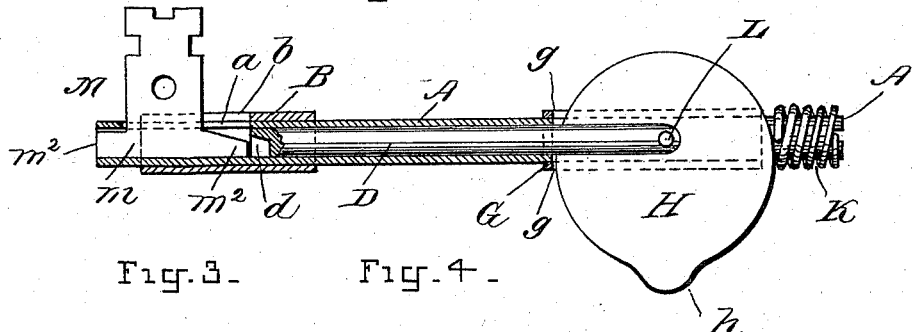
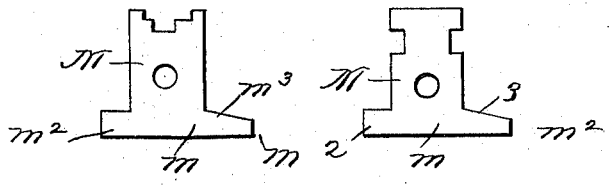
WITNESSES:
C. E. Whitney
C. Gersh
INVENTOR
Jeremiah J. Murphy
BY Edgar Tate & Co
ATTORNEYS

UNITED STATES PATENT OFFICE.

JEREMIAH J. MURPHY, OF NEW YORK, N. Y.

KEY.

SPECIFICATION forming part of Letters Patent No. 577,927, dated March 2, 1897.

Application filed February 17, 1896. Serial No. 579,494. (No model.)

*To all whom it may concern:*

Be it known that I, JEREMIAH J. MURPHY, a citizen of the United States, and a resident of New York, in the county of New York and State of New York, have invented certain new and useful Improvements in Keys, of which the following is a specification, reference being had to the accompanying drawings, forming a part thereof, in which similar letters of reference indicate corresponding parts.

This invention relates to keys; and the object thereof is to provide a key with an interchangeable key-bit, by means of which different key-bits may be connected with the same handle or shaft whenever desired, whereby the same handle or shaft may be provided, whenever necessary, with the key-bit which is adapted to comply with or is applicable to different styles of locks; and with this and other objects in view the invention consists in the construction, combination, and arrangement of parts hereinafter described and claimed.

The invention is fully disclosed in the following specification, of which the accompanying drawings form a part, in which—

Figure 1 is a sectional side elevation of my improved key; Fig. 2, a similar view showing the parts thereof in a different position, and Figs. 3 and 4 are side views of different forms of key-bits.

In the practice of my invention I provide a tubular handle or shaft A, which is provided at its inner end with a longitudinal slot $a$, and on which is mounted a sliding sleeve B, which is provided with a slot $b$, which opens at its outer end, and mounted in said tubular handle or shaft A is a sliding rod D, the inner end of which is provided on its inner side with a cavity or recess $d$. The outer end of the tubular handle or shaft A is provided with a sleeve G, which is rigidly secured thereto and provided with slots $g$ in its upper and lower sides, and the upper and lower sides of the tubular handle or shaft A are also similarly slotted.

Pivotally and eccentrically connected with the end of the sliding rod D within the sleeve G and the tubular shaft or handle A is a disk H, which is adapted to turn in the slots $g$ of the sleeve G, and said disk H is provided at one side with a semicircular projection $h$, and mounted on the outer end of the handle or shaft A is a spiral spring K.

The disk H is placed in the slots in the tubular shaft or handle A and passes through the sleeve G and through the slot in the end of the sliding rod D, and the pivotal pin L passes through the outer end of the rod D, through the disk H, and through the sides of the tubular handle or shaft A, and may also, if desired, pass through the tubular sleeve G.

I also provide a number of key-bits M of different forms, as shown in Figs. 1, 2, 3, and 4, said key-bits being adapted to operate in connection with locks of different styles or forms of construction, and each of these bits is provided with a base-plate $m$, which projects at each side of the key-bit, as shown at $m^2$, and the inner projection $m^2$ is inclined on its upper surface, as shown at $m^3$, and these different key-bits may be connected with the shaft or handle by sliding the sleeve B inwardly thereon and then passing the plates $m$ through the slot $b$ in said sleeve and through the slot or opening $a$ in the top of the tubular handle or shaft A. In order to do this, however, the sliding rod D must first be withdrawn from beneath the slot $a$, which is done by operating the disk H and turning it into the position shown in Fig. 2, and after the key-bit has been inserted said disk is again turned into the position shown in Fig. 1, in which position the key-bit will be securely locked in place by the sliding rod D.

When the disk H is turned into the position shown in Fig. 1, it is securely held in place by spiral spring K, the semicircular projection $b$ thereon passing beneath said spring, as shown in Fig. 1, and it will thus be seen that I provide a key with interchangeable key-bits which are adapted to operate in connection with locks of different styles or constructions, and my improved key is also simple in construction and well adapted to accomplish the result for which it is intended, while being comparatively inexpensive.

It will be understood that the key herein shown and described may be of any desired form or of any desired material, and it is evident that changes in and modifications of the construction herein described may be made without departing from the spirit of my invention or sacrificing its advantages, and I therefore reserve the right to make all such alterations therein and modifications thereof as fairly come within the scope of the invention.

Having fully described my invention, I claim as new and desire to secure by Letters Patent—

1. The herein-described key comprising a tubular shaft or handle, in one end of which is formed a slot, through which the bit is adapted to be inserted, a sliding sleeve mounted on said tubular handle or shaft, a sliding rod mounted therein, and provided with a lug or extension adapted to engage a projection on the bit to lock the same in position, substantially as described.

2. The herein-described key, comprising a tubular shaft or handle in one end of which is formed a slot, through which a key-bit is adapted to be inserted, and means for locking said key-bit in position consisting of a sliding sleeve mounted on said tubular handle or shaft, and the sliding rod mounted therein, which is adapted to operate in connection with said bit, said key-bit being also provided with projections at each side thereof, in connection with one of which said sliding rod operates, and said sliding rod being provided at its outer end with a slot, and said tubular shaft or handle having a sleeve secured thereon, in the upper and lower sides of which are formed slots which register with similar slots formed in the tubular handle or shaft and a disk mounted in said slots, and pivotally and eccentrically connected with said sliding rod, whereby the latter may be operated to secure the key-bit in position, substantially as shown and described.

3. The herein-described key, comprising a tubular shaft or handle, in one end of which is formed a slot, through which the key-bit is adapted to be inserted, and means for locking said key-bit in position, consisting of a sliding sleeve mounted on said tubular handle or shaft, and a sliding rod mounted therein, which is adapted to operate in connection with said key-bit, said key-bit being also provided with projections at each side thereof, in connection with one of which said sliding rod operates, and said sliding rod being provided at its outer end with a slot, and said tubular shaft or handle with the sleeve secured thereon, in the upper and lower sides of which are formed slots which register with similar slots formed in the tubular handle or shaft, and a disk mounted in said slots, and pivotally and eccentrically connected with said sliding rod, whereby the latter may be operated to secure the key-bit in position, said disk being provided on one side with a semicircular projection and said tubular handle or shaft being provided at its outer end with a spiral spring which operates in connection with said semicircular projection, substantially as shown and described.

In testimony that I claim the foregoing as my invention I have signed my name, in presence of the subscribing witnesses, this 14th day of February, 1896.

JERE. J. MURPHY.

Witnesses:
M. B. HARRIS,
VIRGIL B. WELLS.